US005747140A

United States Patent [19]

Heerklotz

[11] Patent Number: 5,747,140

[45] Date of Patent: May 5, 1998

[54] FLAT UPHOLSTERED BODY

[76] Inventor: Siegfried Heerklotz, Am Berg 5, D-49143 Bissendorf, Germany

[21] Appl. No.: 620,524

[22] Filed: Mar. 22, 1996

[30] Foreign Application Priority Data

Mar. 25, 1995 [DE] Germany .......................... 295 05 064.0

[51] Int. Cl.[6] ................................ A47C 7/28; A47C 7/35; F16F 1/18

[52] U.S. Cl. ............................ 428/131; 428/137; 428/181; 428/182; 428/183; 428/184; 428/185; 428/186; 248/630; 267/144; 267/165; 267/160; 297/452.52; 297/452.54; 297/452.56

[58] Field of Search ...................................... 428/131, 137, 428/181, 182, 183, 184, 185, 186; 248/630; 267/144, 165, 160; 297/452.52, 452.54, 452.56

[56] References Cited

U.S. PATENT DOCUMENTS

| | | | |
|---|---|---|---|
| 1,037,729 | 9/1912 | Collins | 267/160 |
| 1,139,732 | 5/1915 | Slick | 267/165 |
| 1,902,361 | 3/1933 | Hamersley | 267/160 |
| 2,217,893 | 10/1940 | Dunajeff | 267/165 |
| 5,364,687 | 11/1994 | Kil et al. | 428/184 |
| 5,551,673 | 9/1996 | Furusawa et al. | 267/160 |

FOREIGN PATENT DOCUMENTS

| | | |
|---|---|---|
| 307755 | 3/1928 | United Kingdom . |

*Primary Examiner*—William Watkins
*Attorney, Agent, or Firm*—Jordan and Hamburg

[57] ABSTRACT

A completely vented upholstered body of grid plates with a wave profile includes solid portions of the grid which pass through the wave extrema of its wave contour. Many of the solid portions of the grid preferably are disposed transversely to at least one wave propagation direction and, in each case, continuously over a large portion of a wavelength, at a distance from one another. There is only a limited, specified bending deformation, during which the solid portions of the grid can be deformed largely independently of one another as if they were individual spiral springs. As a result, the upholstered body has a high point elasticity despite the plate construction. By adroit dimensioning of the course of the wave thickness, an advantageous diffusion of stresses can be achieved without stress peaks. Moreover, the work of deformation is absorbed uniformly in the upholstered material. This results in a long service life of the upholstered body. A single grid plate can be used or several identical or different grid plates, which are stacked one above the other and placed loosely on top of one another, can be fixed at the edges or fixed with positive locking or positive substance locking over solid portions of the grid, which are in supportive engagement with adjacent grid plates. Elastomers, such as natural rubber and thermoplastic elastomer, spring steel or plastics come in to consideration as material.

27 Claims, 7 Drawing Sheets

2
2
3
2
III
III

IV
IV
2
3
3
4
10
9'
9
9
15

1
1
3
2
2
5
6
14

FLAT UPHOLSTERED BODY

BACKGROUND OF THE INVENTION

The invention relates to a flat upholstered body, consisting of at least one grid plate of a springy material with a plurality of solid portions forming the boundaries of grid openings.

In the case of known such upholstered bodies (GB-A-307 755) as used, in particular, as upholstered seats and mattresses, the grid plate has a basic flat construction, and the upholstered or spring effect of the upholstered body, when under a load, is based on a pressure deformation of the elastic material, essentially only at the crossing points. In the known case, the elastic material is foam and preferably a foamed rubber. Due to the buckling in the foam, there are high peak stresses, which rapidly lead to destruction.

SUMMARY OF THE INVENTION

It is an object of the invention to provide a flat upholstered body of the initially given type, which can be vented outstandingly and has an improved spring action and a long service life.

Pursuant to the invention, this objective is accomplished owing to the fact that the grid plate is constructed as a corrugated body with solid portions, which form the grid meshes and pass through the maxima and minima of the corrugated contour, and to the fact that at least many of these solid portions of the grid meshes are disposed preferably transversely to at least one wave propagation direction at a distance from one another and, moreover, in each case, continuously over a large portion of a wavelength.

In the case of this development, there is no pressure deformation of the upholstered material under load that is disadvantageous to the service life of the upholstered body. Instead, pursuant to the invention, there is a specified, limited bending deformation of the grid plate because of the construction of the latter as a corrugated body. During this limited bending deformation, the solid portions forming the grid mesh can be deformed largely independently of one another in the form of individual spiral springs. As a result, the inventive, upholstered body has spring properties, which are distinguished by a high degree of point elasticity. The wave contour or corrugation ensures an advantageous diffusion of stresses and a uniform absorption of the work of deformation in the upholstered material, which favors the long service life of the upholstered body.

Accordingly, for small spring deflections, a single grid plate, constructed pursuant to the invention as a corrugated body, can be sufficient, while for upholstered bodies, which must satisfy higher requirements, such as mattresses, the inventive upholstered body may comprise two or more such grid plates stacked one above the other, the upper grid plate in each case being supported with its lower wave extrema (minima) on the upper wave extrema (maxima) of the next lower grid plate.

For loosely stacking them one above the other, with the advantage of outstanding cleaning capabilities even within the upholstered body, there are grid plates with one wave propagation direction, the peaks and valleys of which are largely formed by solid portions of the grid extending longitudinally to the crests and valleys. The grid plates are superimposed on one another with wave propagation directions, which extend alternately orthogonally to one another, so that the solid portions of the grids, which extend in wave crests and valleys, cross one another in each case in pairs. Even when they are stretched because of the load, the grid plates offer sufficient latitude, so that the supportive engagement of the solid portion of the grid is always retained.

Greater spring hardness is achievable with grid plates, the solid portions of the grids of which, when in supportive engagement, are constructed so that they can be fixed to one another by positive substance locking or positive locking. At the same time, the solid portions of the grid can form point-like regions in the wave crests and valleys, which lie precisely opposite one another in pairs during the stacking of the grid plates. Moreover, it is also possible to use grid plates, the wave contour of which is characterized by a wave propagation in two different directions. The solid portions of the grid pass through crests and valleys of the waves or corrugations, which are then punctiform, and, when several grid plates are stacked one above the other, engage one another in a supportive manner in places, where they are fixed to one another.

For simple upholstering, for which the demands that have to be met by the point elasticity are less, inventive upholstery plates can also be used advantageously without any distance between the solid portions of the grid transversely to the wave propagation direction.

Grid plates of cross-linked elastomers, such as natural rubber, are pressed and subsequently repunched. Grid plates from thermoplastic materials and thermoplastic elastomers (TPE) are produced by injection molding or by extrusion and punching. Plates of spring steel are bent and stamped.

Further distinguishing features and advantages arise out of the claims and the following specification in conjunction with the drawings, in which several examples of the object of the invention are illustrated diagrammatically.

DESCRIPTION OF THE PREFERRED EMBODIMENTS

Figure 1:
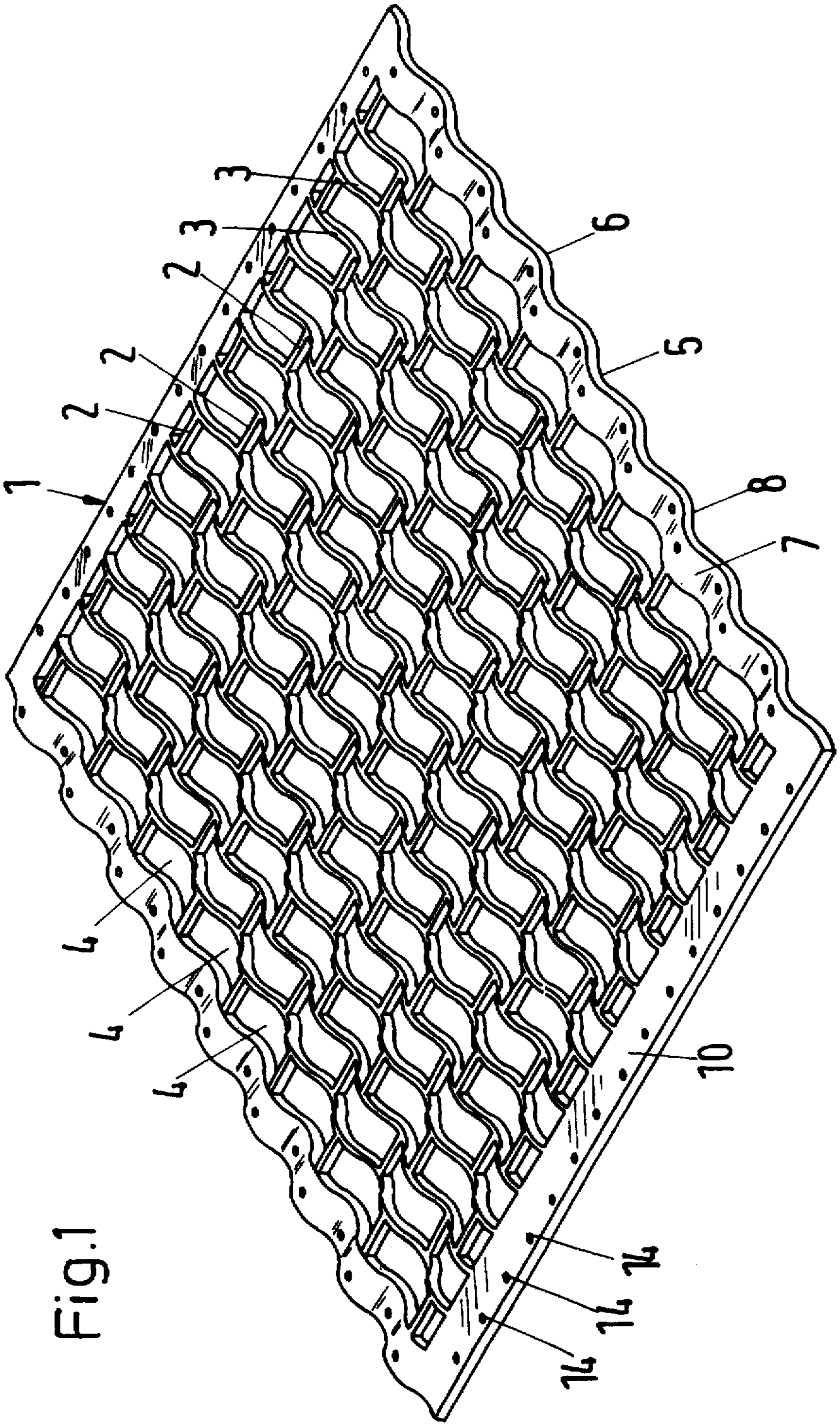
FIG. 1 shows a perspective representation of a flat upholstered body in the form of a single corrugated grid plate according to a first example of the invention.

In FIG. 1, a grid plate, which is labeled 1 as a whole, with an upholstered surface, which is rectangular in plan view, is shown as a flat upholstered body. The grid plate 1 consists of a springy material, particularly an elastomeric material, optionally with fiber inclusions, and comprises solid portions 2 and 3 of the grid in a uniformly repeating pattern. At the edge, these solid portions 2 and 3 form the borders of a plurality of grid openings 4.

The grid plate 1 is constructed as a corrugated body with solid portions 2 of the grid passing through the maxima and minima of its wave contour. The wave maxima and minima are formed by crests 5 and valleys 6 of a wave contour, with one direction of wave propagation and constant wall thickness and the wave length is the same on the upper side 7 and on the underside 8. The solid portions 2 of the grid extend here over sections of the wave crests 5 and valleys 6 in their longitudinal direction. At their ends, the solid portions 2 of the grid form a junction 17 with the solid portions 3 of the grid, which extend in the wave propagation direction. The mutual, constant lateral distance between adjacent solid portions 3 of the grid, which extend parallel to one another over the whole length of the grid plate 1 in the direction of wave propagation, in each case runs continuously over almost a whole wavelength, that is, without connections. This distance defines here a longitudinal distance between solid portions 2 of a grid adjacent transversely to the direction of wave propagation, as a result of which the stiffening effect of the corrugated shape perpendicular to the wave propagation direction is largely canceled once again and a high point elasticity of the grid plate 1 is achieved. The longitudinal distance between two adjacent solid portions 2 of the grid is equal to the transverse dimension, relative to the wave propagation direction, of the grid openings 4.

In plan view, the solid portions 2 and 3 of the grid form a pattern, which repeats in two directions. A single wavelength or a complete multiple of a wavelength forms the repeating length. Conversely, the wavelength can be a single repeating length or a complete multiple of the repeating length. The repeating length and the wavelength are the same in both directions.

The solid portions 2, 3 of the grid, passing through the wave maxima and minima, are shaped and disposed so that, when the grid plate 1 is turned by rotating it through 180° about one of the two central axes 16 lying in its center plane, the wave maxima and minima in each case alternately go over into one another congruently when viewed in plan view.

Upon rotation through 90° or 270° about the axis 19, which runs orthogonally to their center plane and centrally to their outer regions, wave maxima and minima in each case alternately and in pairs coincide partially when viewed in plan view.

Figures 2, 3, 4:
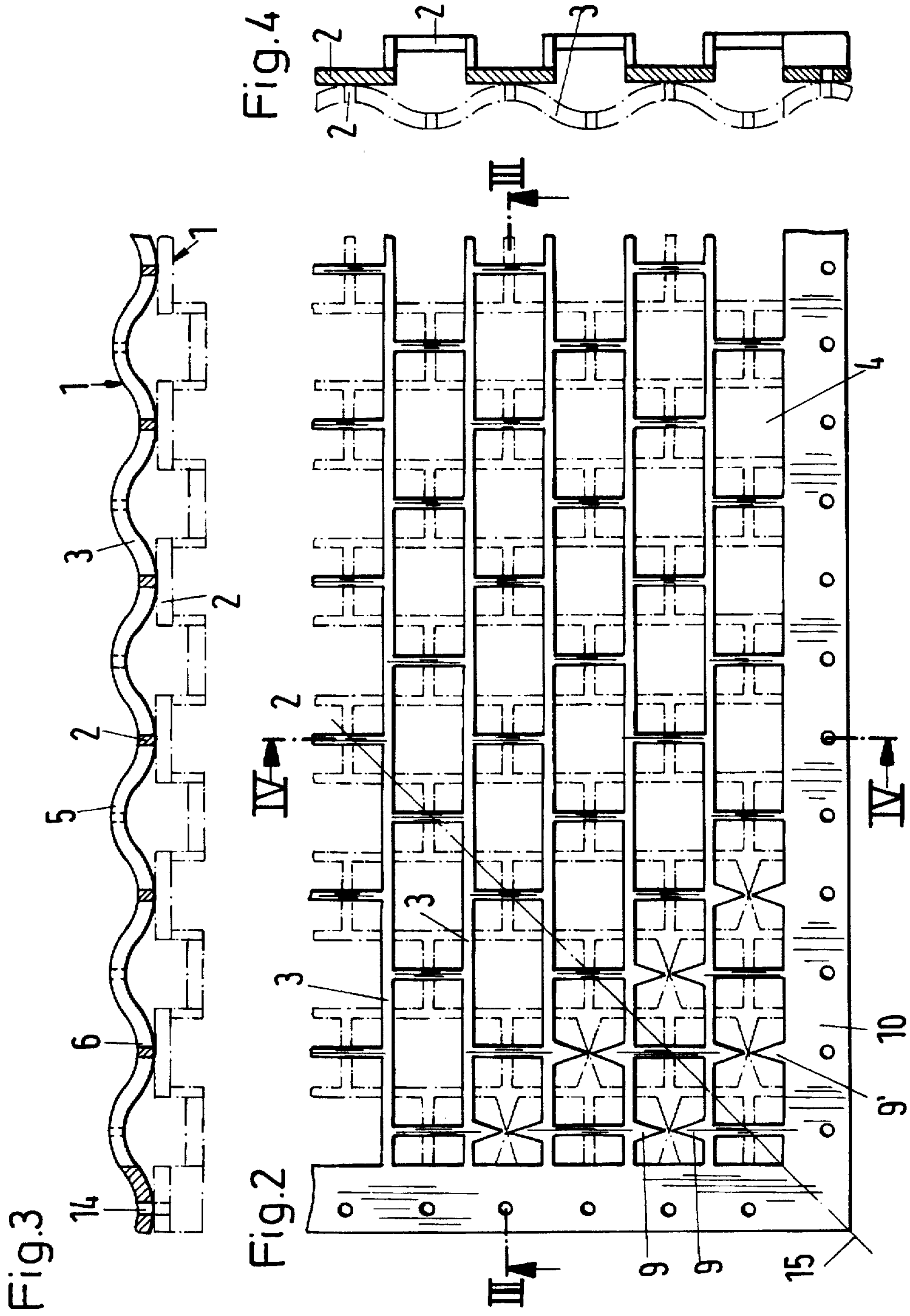
FIG. 2 shows a plan view of a corner region of the grid plate of FIG. 1 with an identical grid plate, which lies beneath the first grid plate, is indicated by lines of dots and dashes and is turned relative to the upper grid plate.
FIG. 3 shows a section along the line III—III of FIG. 2.
FIG. 4 shows a section along the line IV—IV of FIG. 2.

As is evident particularly from FIGS. 2 to 4, the solid portions 2 of the grid between the adjacent solid portions 3 of the grid are in each case disposed so as to be offset centrally to one another. According to a modification, illustrated in the left corner of FIG. 2, the solid portions 2 of the grid are extended by projections 9, which are taken beyond the in each case adjoining solid portion 3 of the grid and directed against one another. The projections 9 decrease the longitudinal distance between two solid portions 2 of the grid. As a result, when several grid plates 1 are stacked loosely on top of one another with crossing wave crests 5 and valleys 6, the permissible tolerance for a mutual shifting is increased, in which the supportive engagement between two solid portions of the grid is still ensured and, consequently, fixation of the solid portions 2 of the grid is not required. Projections 9', which emanate from the edge 10 of the grid plate 1, correspond to the projections 9. Edge 10, as well as the three remaining edges of the grid plate 1 are kept free of grid openings 4.

Figure 5:
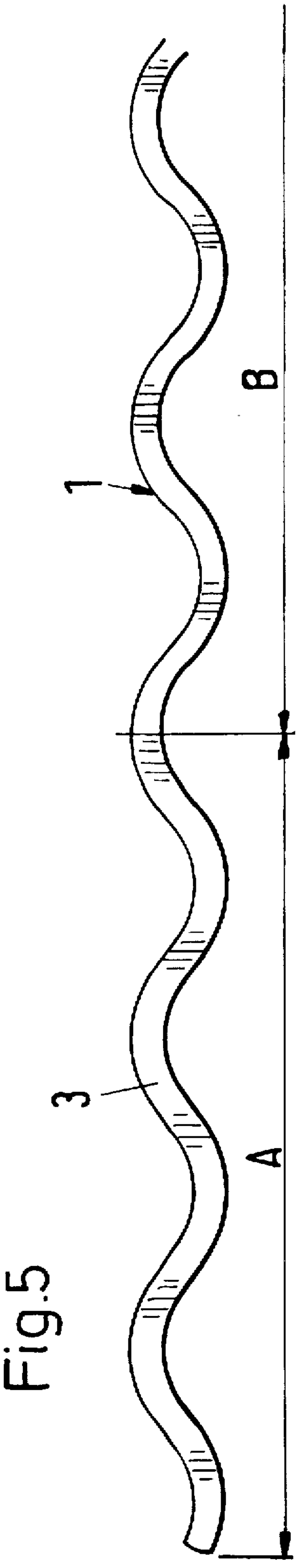
FIG. 5 shows a modification of the grid plate of FIGS. 1 to 4, in a sectional representation corresponding to that of FIG. 3.

The dimensions of the thickness of the solid portions 2, 3 of the grid can also differ in the wave propagation direction. By these means, a different spring hardness or flexural strength of the grid plate 1 can also be produced in zones following one another in the wave propagation direction. In the case of the example shown in FIG. 5, a first region A with solid portions of the grid of a given thickness is shown by means of a solid portion 3 of the grid. Adjoining this region A, there is a region B, in which the solid portions of the grid have a lesser thickness and the wave contour has a correspondingly larger wave amplitude, so that the corrugation of the grid plate 1 has a constant overall height despite such differences in the thickness of the solid portion of the grid. Moreover, peak stresses can be reduced and the work of deformation can be distributed uniformly if the solid portions 2, 3 of the grid have different thicknesses.

Figure 6:
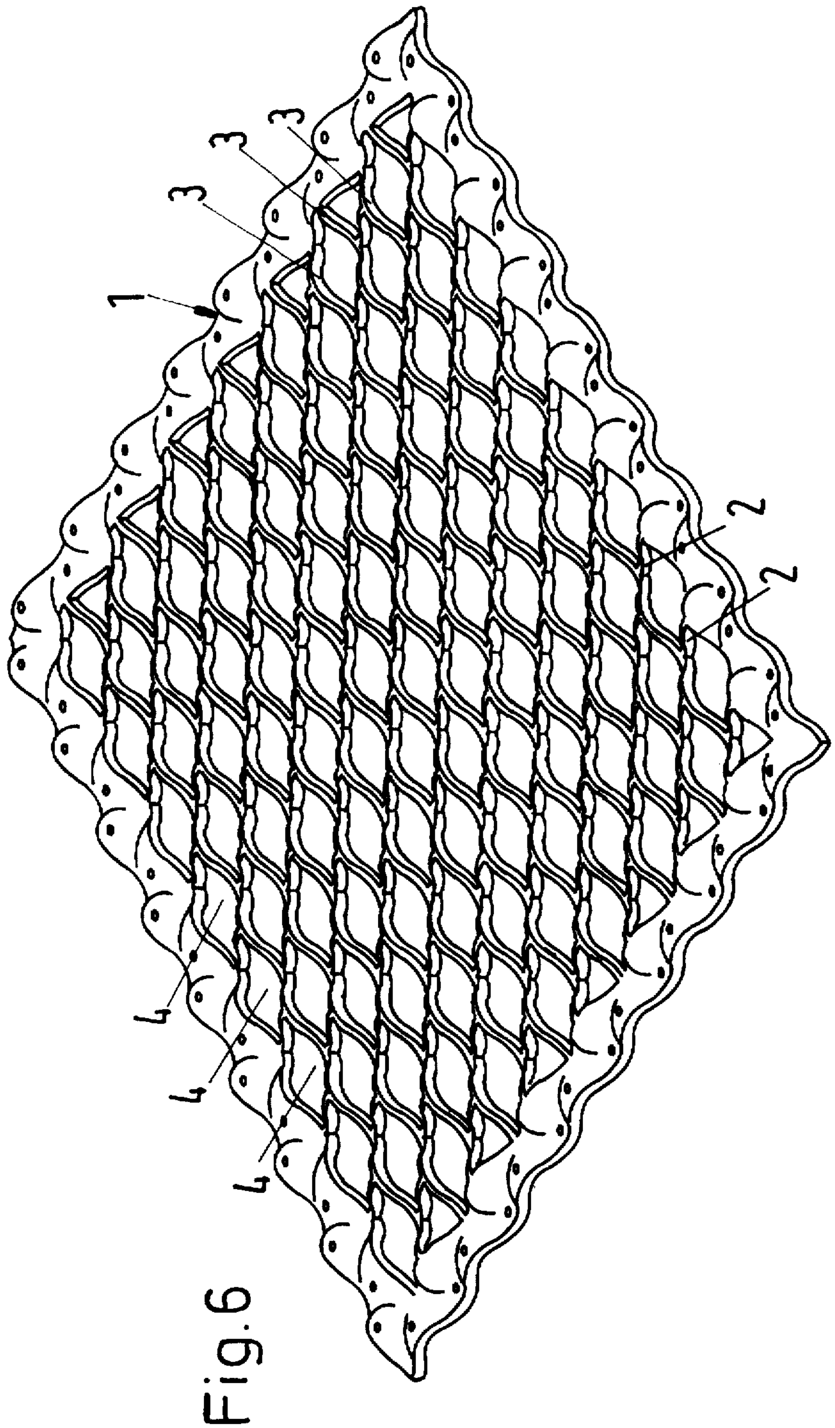
FIG. 6 shows a perspective representation of a corrugated grid plate, according to a further example of the invention.

FIG. 6 illustrates a further embodiment, for which the grid plate 1 has the same basic pattern as the solid portions 2' and 3 of the grid forming the boundary of the grid openings 4. However, the wave contour of the grid plate 1 is characterized here by a wave propagation in two different directions, the solid portions 2', 3 of the grid passing through the wave maxima and minima in each case at one point. Due to this wave contour with two different wave forms, running horizontally and perpendicularly to one another in the example shown, the grid plate 1 achieves a structure similar to that of an egg carton. When the grid plate 1 is turned through 180° about one of its central axes 16, wave maxima and minima alternately, totally or partially and congruently go over into one another when viewed in plan view.

The junctions 17 in the regions 18 of the wave maxima and minima are constructed so that, when several grid plates are stacked on top of one another, they can be fixed there with positive substance locking at the solid portions 2', 3 of the adjacent grid plate 1, which attain supportive engagement with them.

Figure 13:
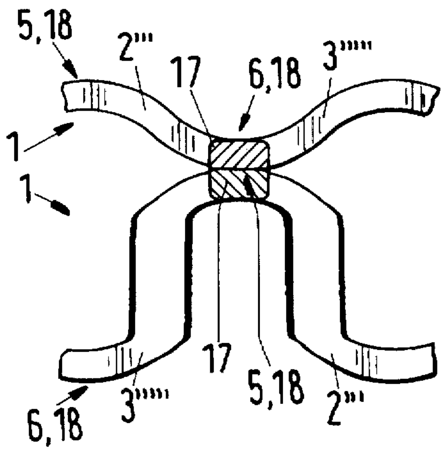

FIG. 13 shows details of an example of the invention similar to the one above with the solid portions 2''', 3'''' passing through the wave maxima and minima.

Figure 7:
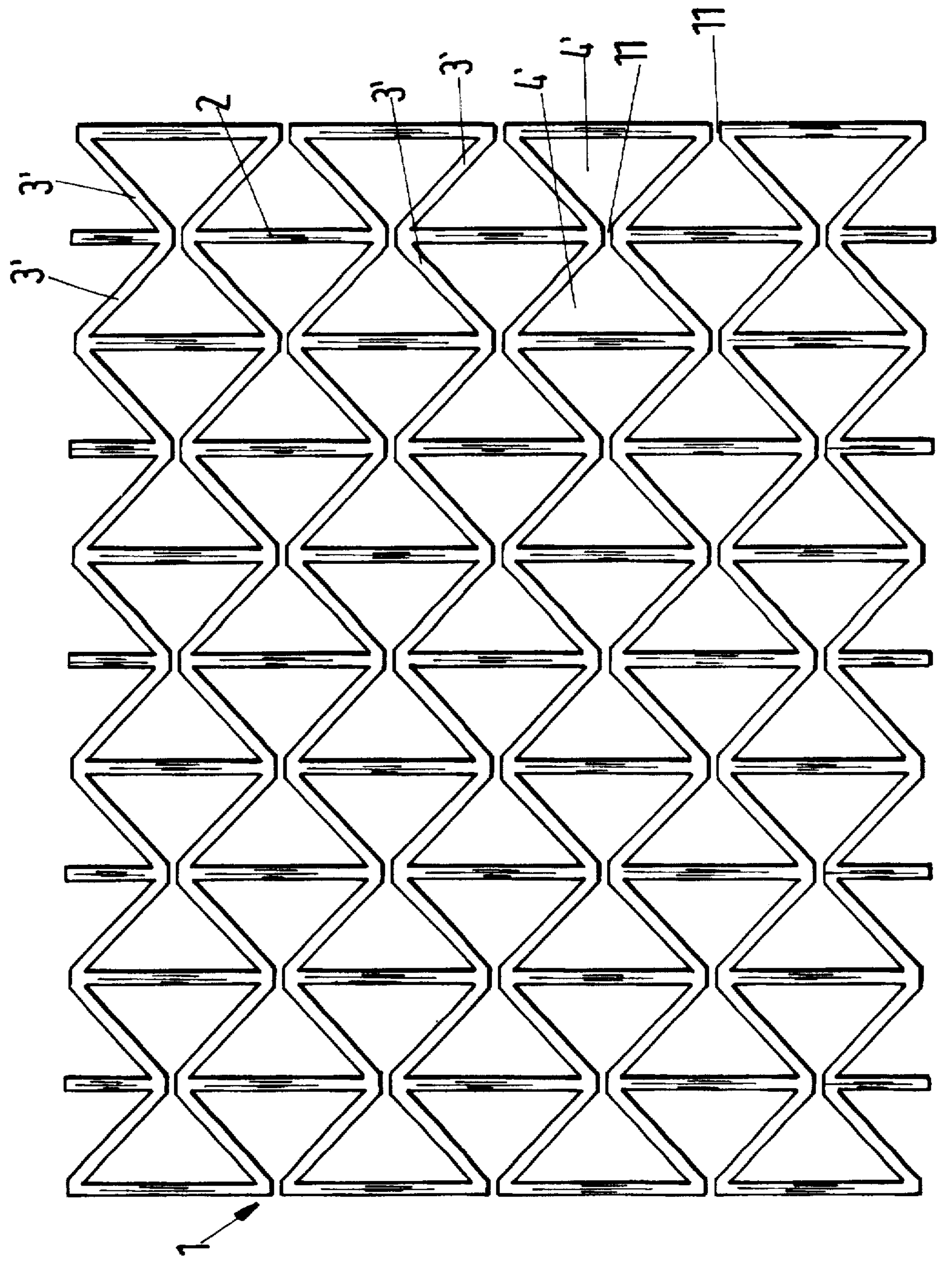
FIG. 7 shows a plan view of a corrugated grid plate according to yet another example of the invention.

By means of a section of the grid plate 1, FIG. 7 illustrates an embodiment in plan view. The ends of the solid portions 2 of the grid of this embodiment extend over sections of the wave maxima 5 and minima 6 forming junctions 17 at the solid portions 3' of the grid, which extends transversely to the direction of wave propagation. All solid portions 2, 3' of the grid, adjacent transversely to the wave propagation direction, are disposed in this direction in each case at a distance from one another and continuously over almost a whole wavelength, so that the pairs of solid portions 3' of the grid, forming the single spiral spring, can be deformed largely independently of one another. This results in a high point elasticity of the grid plate 1. Together with the solid portions 3' of the grid, the solid portions 2 of the grid on either side form in each case a pair of grid openings 4' here, which have the basic shape of an isosceles triangle in plan view. The pairs of triangles or grid openings 4' are offset centrally to one another in the longitudinal direction of the wave crests and valleys 5, 6 and nested in the manner shown in FIG. 7.

The longitudinal distance between the solid portions 2 of the grid running in the longitudinal direction of the crests and valleys of the waves is formed for this example by comparatively narrow opening gaps 11 between the individual solid portions 2. Compared to the comparatively large distances between the solid portions 2 of the grid following one another in the longitudinal direction of the maxima and minima of the waves, as defined in the example of FIGS. 1 to 4 by the transverse dimensions of the lattice openings 4, the construction of the grid plate of FIG. 7 offers maximum tolerance with respect to shifts between superimposed grid plates 1. This embodiment reacts more softly due to the overall longer length of the solid portions of the grid. When the grid plate 1 is turned about one of its central axes 16, the wave minima and maxima, seen in plan view, in each case go over into one another completely congruently.

Figure 8:
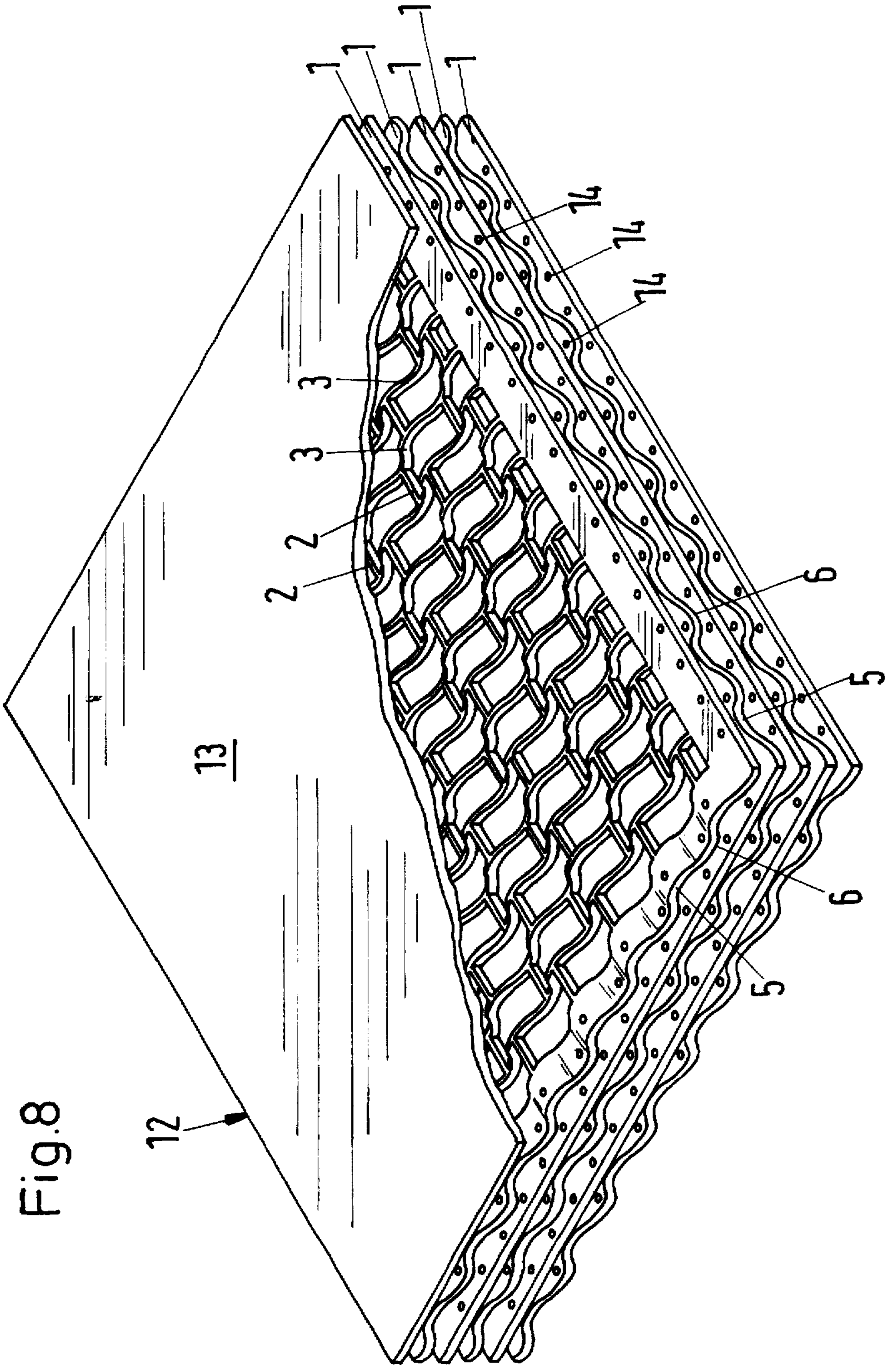
FIG. 8 shows a perspective representation of an inventive upholstered body with several corrugated grid plates stacked one above the other, FIGS. 9, 10, 11, and 12 each show a plan view, truncated on all sides, of a corrugated grid plate according to further examples of the invention, FIGS. 13 and 14 each show a left and right truncated vertical section through the region of a supportive engagement of two superimposed corrugated grid plates according to two further examples of the invention.

The upholstered body of FIG. 8 is formed from a construction of layers, which is labeled 12 as a whole and of which the grid construction of the upper grid plate 1, which corresponds to that of FIGS. 1 to 4, is made visible by breaking away the corner region of an upper, flat covering plate 13.

Compared to the representation of FIG. 1, the upper grid plate 1, which is equilateral in the example shown, is, however, shown rotated through 90° about a vertical axis. In the case of the example shown, with a total of five square grid plates 1 stacked on top of one another, the in each case top grid plate 1 is supported, with its wave minima, the solid portions 2 of the grid running in the longitudinal direction of the wave valleys 6, on the upper wave maxima, the solid portions 2 of the grid running in the longitudinal direction of the wave crests 5, of the next lower grid plate 1, the two grid plates crossing one another centrally, as is evident particularly from FIGS. 2 to 4. The specified mutual position of the individual grid plates 1 can also be maintained by a mutual fixing at the edges, as is illustrated by the fastening points 14 at the edge, by way of positive substance locking or positive locking.

To achieve this mutual supporting of the grid plates 1 in the layered construction at the wave maxima and minima, the pattern of the solid portions 2, 3 of the grid, seen in plan view, is selected so that, upon reflection at an axis 15 (FIG. 2), which is located in the plan view plane and halves the pattern, the solid portions 2 of the grid, which pass through the maxima and minima of the waves, are superimposed on one another and cross one another centrally in the example shown. Axis 15 is the line bisecting the corner angle.

If the upholstered body has an upholstered surface which, in plan view, offers an external shape, which is invariant with respect to a rotation through at least one particular angle of, for example, 90° in the case of a square, the stacking on top of one another of individual grid plates 1 with only one direction of wave propagation into an upholstered body can be brought about with a single, identical shape of the grid plates 1 by selecting a pattern and offsetting it to the edge in line with this purpose. Such shapes comprise, for example, a circle or an equilateral polygon. In other cases, particularly in the case of a grid plate 1, which is rectangular in plan view and has a pair of longer and a pair of shorter side edges, two different shapes of grid plates 1, for which the wave propagation directions can run at right angles to one another, are required to form an upholstered body with several, superimposed, layered grid plates 1 of FIG. 8.

In the case of grid plates 1 with two directions of wave propagation and/or punctiform formation of the wave maxima and minima, superpositioning of identical grid plates 1 is possible with appropriate selection of and offsetting of the pattern to the edge.

Figure 9:
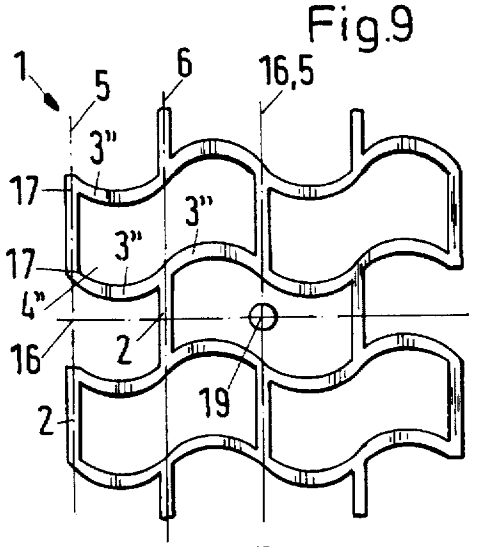
Figure 10:
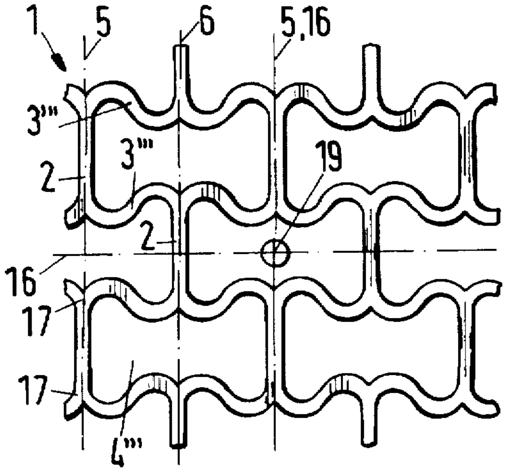

In FIGS. 9 and 10, two examples of a grid plate 1 with one direction of wave propagation are shown. Compared to the previous examples, the solid portions 3" and 3'" of the grid are arched.

The stretching in the direction of wave propagation, which occurs because the wave profile is flattened when the grid plate 1 is under a load, is compensated for by the compression of the arched, solid portions 3" and 3'" of the grid extending in the direction of wave propagation, so that the shifting of two superimposed grid plates 1 relative to one another is reduced. This permits larger wave amplitudes to be realized with greater stiffness and greater spring deflection and, with that, higher upholstered bodies with the same number of grid plates 1, which leads to a decrease in overall costs. The spring action becomes softer due to the arched solid portions 3" and 3'" of the grid, because of the greater length of the spiral springs formed by the solid portions 3" and 3'" of the grid.

Figure 11:
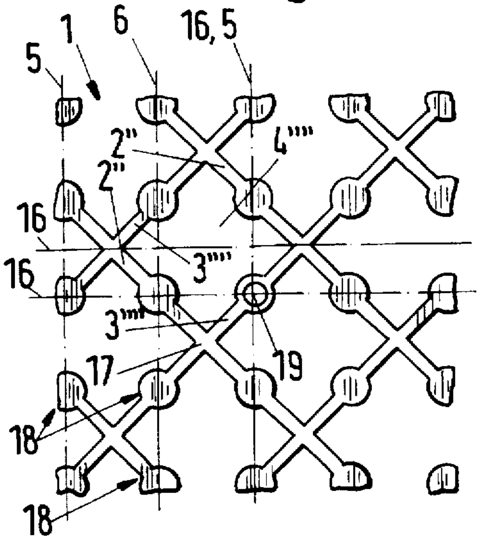
Figure 12:
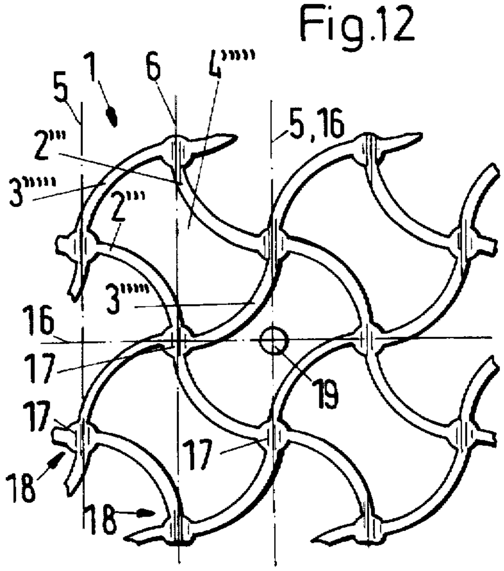

FIGS. 11 and 12 show two examples of an inventive grid plate 1, which can be produced originally from corrugated panels with one direction of wave propagation; however, after the grid pattern is introduced with punctiform construction of the wave maxima and minima, several wave propagation directions, three in FIG. 11 and four in FIG. 12, can be recognized.

The solid portions 2" and 3"" or 2'" and 3""' of the grid form junctions 7, in which they cross one another orthogonally. All rows of the solid portions 2" and 3"" or 2'" and 3""' adjacent to one another transversely to the wave propagation direction, that is, in the direction of the original wave crests 5 and valleys 6 here, are disposed transversely to the wave propagation direction at a distance from one another continuously over almost a whole wavelength. In this example, the distances in this direction are not constant over a wavelength, as they are in the examples of FIGS. 1 to 6. Instead, they vary depending on the formation of the solid portions 2" and 3"" or 2'" and 3""' of the grid.

On passing through a wave maxima or minima, the solid portions 2", 3"" or 2'", 3""' of a grid form circular expansions in the region 18, at which, when two or more grid plates 1 are superimposed, they come into supportive engagement and can be fixed with positive substance locking at the solid portions 2", 3"" or 2'", 3""' of the adjacent grid plates 1 coming in each case into supportive engagement with them, for example, by gluing or welding.

On rotating the grid plate 1 through 90° or 270° about the axis 19 running orthogonally to its center plane or centrally to its outer edges, wave maxima and minima, seen in plan view, come to coincide in each case in pairs. As a result, when two identical grid plates 1 are stacked on top of one another and turned in this way relative to one another, all wave maxima and minima of the example of FIG. 12 and approximately 50% of the wave maxima and minima of FIG. 11 mutually attain supportive engagement in pairs.

In FIG. 11, the junctions 17 in each case lie between the regions 18. The pattern of solid portions 2", 3"" of the grid is selected so that, upon reflection at central axes 16 of the upholstered area, selected here by way of example, the regions 18 are superimposed, so that a multilayered upholstered body with only one grid plate is realizable, in that this grid plate 1 in the in each case following layer is turned about the central axis 16 by 180°, as a result of which the wave valleys 6 of the upper grid plate 1 come into supportive engagement with the wave crests 5 of the lower grid plate 1 in their regions 18 and can be fixed to one another there.

In FIG. 12, the junctions 17 are disposed in regions 18 of the wave crests 5 or valleys 6. There they can be fixed with positive substance locking to the respective solid portion 2''', 3'''' of the adjacent grid plate 1 engaging them in a supportive manner, when two or more grid plates 1 are superimposed.

By way of example, two central axes 16 of two possible grid plates 1 forming the section of FIG. 12 are marked once again. Upon reflection at these central axes 16, the regions 18 are congruent, as a result of which, corresponding to FIG. 11, the regions 18 of the wave crests 5 of the lower grid plate 1 come into supportive engagement with the regions 18 of the wave valleys 6 of the upper grid plate 1 and can be fixed to one another with positive substance locking when a grid plate 1 is turned by rotation about a central axis 16 through 180°.

The arched solid portions 2''', 3'''' of the grid decrease the expansion of the grid plate 1 under load by flattening its wave contour, owing to the fact that they are compressed, the radius of the arc being reduced by bending.

The solid portions 2''', 3'''' of the grid pass through the wave maxima and minima by coming together at their ends with the formation of a junction 17. Their end point in each case is common to four solid portions 2''', 3'''' of the grid and at the same time is the junction 17 disposed at a wave maximum or minimum.

Figure 14:
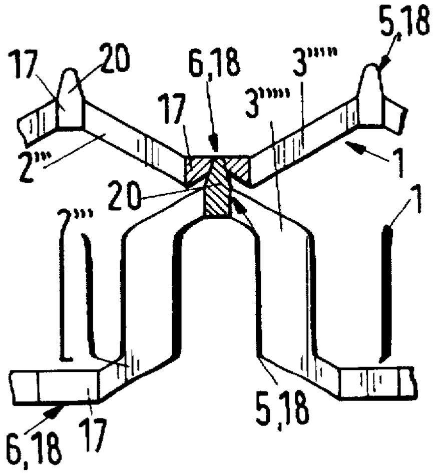

While FIG. 13 shows a connection between two grid plates 1 at their mutually opposite regions 18 by positive substance locking, FIG. 14 shows a fixation by positive locking. The wave contour is formed by a trapezoidal polygonal course, the corner points of which in each case are disposed in the wave maxima and minima. The solid portions 2''', 3'''' of the grid plate 1 are linear and, at a wave valley 6, go over into a junction 17, which is provided centrally with a conical through hole in the region 18 of the wave valley 6. The other ends of the solid portion 3'''' of the grid also go over into junctions 17, which form a pin 20 with a conical top, which is disposed in the region 18 of the wave crests 5.

With respect to the upper grid plate 1, the lower grid plate 1 is rotated about a vertical axis 19 (FIG. 12) through an angle of 90°. The pattern of the solid portions 2''', 3'''' of the grid is constructed so that, after such a rotation, the upright conical pins 20 of the region 19 in the wave crests 5 attain supportive engagement with the throughholes of the regions 18 of the wave valleys 6, the cone of the throughholes being constructed in two steps. The first region serves for threading conical pin 20 until the two central axes are aligned. The second region serves for the accurately fitting, supportive engagement of the two, so that, when the upholstered body is under load, both are centered and wedged together, so that positive locking, reinforced by frictional forces, results.

Figure 15:
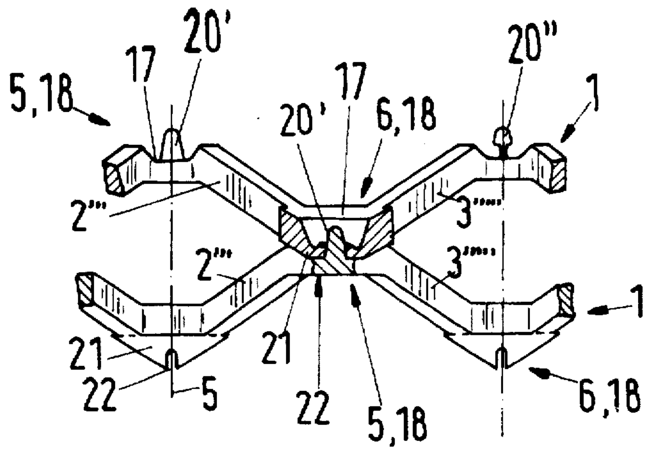
FIG. 15 shows a left and right truncated vertical section and FIG. 16 shows a plan view of the region of a supportive engagement of two superimposed corrugated grid plates according to a further example of the invention, with two variations of the lugs, FIGS. 17 and 18 each show a bilaterally truncated side view of a further example of a wave contour of the corrugated grid plate used pursuant to the invention.
Figure 16:
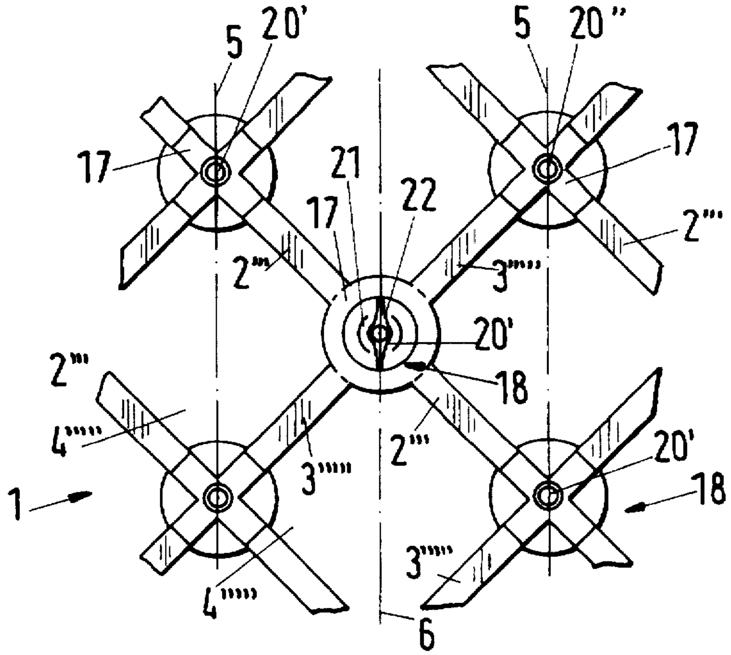

FIGS. 15 and 16 show a further example of an inventive grid plate 1 with one wave propagation direction but punctiform formation of wave maxima and minima. The wave maxima are formed by pins 20', 20" and the wave minima are formed by conical membranes 21, the thickness of which is less than that of the solid portions 2''', 3'''' of the grid and which are provided with a slot 22.

When two grid plates 1 are stacked on top of one another, the pin 20', 20" arches the membrane 21 upward in the region of the slot 22, as a result of which the width of the slot is increased up to the thickness of the pin and the pin 20', 20" is taken up by the slot 22 and wedged there. The ring-shaped junction 17 of the wave minimum of the upper grid plate 1 comes to lie against the solid portions 2''', 3'''' of the lower grid plate 1. Both grid plates 1 are fixed to one another to prevent shifting in the plane of the grid plates. When vertical tensile forces arise, which could lead to a separation of the two grid plates 1, the pin 20', 20" takes along the inner edge of the slot 22 because of the high coefficient of friction of elastomers, which leads to an even stronger wedging of the two because of the geometry.

Figure 17:
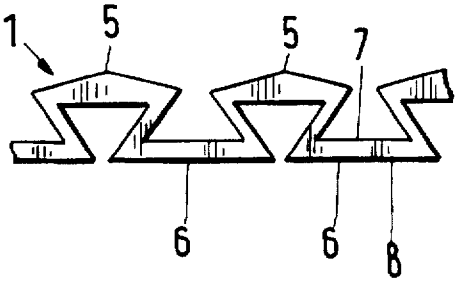
Figure 18:
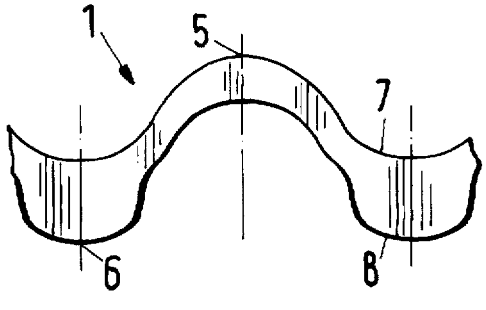

By forming a backcut at the pin 20", a supportive engagement with a pure positive locking like, that of a snap fastener, can be achieved in the vertical as well as in the horizontal direction FIGS. 17 and 18 show two further examples of the wave contours of inventive, corrugated grid plates 1

In FIG. 17, on the one hand the upper side 7 and the underside 8 and, on the other, wave crests 5 and valleys 6, that is, the regions of the wave maxima and minima of the corrugated grid plate 1 are formed by different wave contours. The wave contour does not follow a mathematical function; it is S-shaped and partially turns back in loops.

In FIG. 18, the wave profile is point symmetrical to the reversal points of the center line of the profile, as a result of which the wave maxima and minima are shaped identically. In both examples, the thicknesses of the wave profile on the wave length differ to compensate for stress crests and to distribute the shape-changing work uniformly, and, furthermore, the wave contours are symmetrical to central axes perpendicular to the center plane of the grid plates.

Inventive examples are also effective if the wave contour is not shaped symmetrically to any central axis perpendicular to the center plane of the grid plates. The constant repetition of identical waves is also not necessary. The wave contour can differ from wave to wave with different amplitudes, different wave lengths, different wall thicknesses or wall thicknesses following different courses and different shaping.

In the case of the upholstered body shown and described, the total area of the openings 4, 4', 4", 4''', 4"" and 4''''' of the grid plate 1 in plan view is about 45% to 95% of the total area of the grid plate 1. The thickness of the solid portions 2, 3; 2', 3; 2, 3'; 2, 3"; 2, 3'''; 2", 3""; 2''', 3'''' can amount to 10 to 100% of the wave amplitude of the grid plate 1. If the upholstered body is to be used in mattresses and upholstered seats, a wave amplitude of 5 to 50 mm preferably comes into consideration. The thickness of the solid portions 2, 3; 2', 3; 2, 3'; 2, 3"; 2, 3'''; 2", 3""; 2''', 3'''' is calculated from this to be in the range from about 0 to 50 mm.

To develop zones of different hardness in the upholstered body, it is basically possible to provide regions in the individual grid plates 1, in which the proportion of openings is different, or also different regions with different wavelengths or, in an upholstered body comprising several grid plates 1 disposed next to one another and/or above one another, grid plates 1 with, in each case, a different construction of the grid openings 4, 4', 4", 4''', 4"", 4''''' over the whole of the surface also with respect to the area of the openings and/or different wavelengths, can be used instead or in addition to the methods described for changing the spring hardness.

Accordingly, within the scope of the claims, other refinements and modifications are also conceivable and possible.

The object of the invention is not limited to the examples shown in the drawings and described above.

I claim:

1. A generally flat body to be upholstered comprising at least one grid plate made of a resilient material, said grid plate including a plurality of solid portions which form the boundaries of a plurality of grid openings, said solid portions including a plurality of spaced wave sections each having a plurality of extremea in the form of crests and valleys, and a plurality of spaced extended sections extending between said plurality of spaced wave sections, said extended sections connecting some of the extremea of one wave section to some of the extremea of a juxtaposed wave section disposed on one side of said one wave section and said extended sections connecting the other of the extremea of said one wave section to some of the extremea of a juxtaposed wave section disposed on the side of said one wave section which is opposite said one side such that said spaced wave sections and said spaced extended sections define said grid openings.

2. A generally flat body according to claim 1 where the total area of said grid openings in plan view of the grid plate is about 45% to 95% of the total area of the grid plate in plan view.

3. A generally flat body according to claim 1 wherein said spaced wave sections are substantially parallel to one another, said grid plate having a longitudinal axis parallel to said parallel wave sections, said grid plate having a transverse axis generally perpendicular to said longitudinal axis, said plurality of parallel wave sections being disposed such that the crests of said wave sections are generally aligned parallel to said transverse axis and the valleys of said wave sections are generally aligned parallel to said transverse axis.

4. A generally flat body according to claim 3 wherein the crests of said one wave section are connected by said extended sections to the crests of said juxtaposed wave section disposed on said one side of said one wave section and the valleys of said one wave section are connected by said extended sections to the valleys of the juxtaposed wave section disposed on the side of said one wave section which is opposite said one side.

5. A generally flat body according to claim 1 wherein said spaced wave sections are substantially parallel to one another, said grid plate having a longitudinal axis parallel to said parallel wave sections, said grid plate having a transverse axis generally perpendicular to said longitudinal axis, said plurality of parallel wave sections being disposed such that alternate crests and valleys are generally aligned parallel to said transverse axis.

6. A generally flat body according to claim 5 wherein the crests of said one wave section are connected by said extended sections to the valleys of said juxtaposed wave section disposed on said one side of said one wave section and the valleys of said one wave section are connected by said extended sections to the crests of the juxtaposed wave section disposed on the side of said one wave section which is opposite said one side.

7. A generally flat body according to claim 1 wherein each of said wave sections has an arc-shaped configuration.

8. A generally flat body according to claim 1 wherein said grid plate is a generally planar grid plate, each of said wave sections being formed with an undulation configuration having alternate concave portions and convex portions when said generally planar grid plate is viewed in plan view perpendicular to said generally planar grid plate.

9. A generally flat body according to claim 1 wherein said wave sections have a different thickness along the length thereof.

10. A generally flat body according to claim 1 wherein the pattern of said plurality of solid portions of said at least one grid plate is such that one part of said one grid plate can be turned relative to another part of said grid plate to form two superimposed grid parts with the crests of the wave sections of said one grid part being in superimposed relationship with the valleys of the wave sections of said other grid part.

11. A generally flat body according to claim 10 wherein said one part of said grid plate is turned relative to said other part of said grid plate 180 degrees about an axis disposed in the general plane of said grid plate.

12. A generally flat body according to claim 10 wherein said one part of said grid plate is turned relative to said other part of said grid plate about an axis perpendicular to the general plane of said grid plate.

13. A plurality of generally flat plates to be upholstered, each of said plates being made of a resilient material, each of said grid plates including a plurality of solid portions which form the boundaries of a plurality of grid openings, said solid portions including a plurality of spaced wave sections each having a plurality of extremea in the form of crests and valleys, and a plurality of spaced extended sections extending between and connected to said plurality of spaced wave sections at said extremea such that said spaced wave sections and said spaced extended sections define said grid openings, one of said grid plates being disposed in superimposed relationship with another of said grid plates such that said one grid plate contacts said other grid plate.

14. A plurality of generally flat grid plates according to claim 13 wherein the crests of the wave sections of said one grid plate contact the valleys of the wave sections of said other grid plate.

15. A plurality of generally flat grid plates according to claim 13 further comprising connecting means connecting said one grid plate to said other grid plate where said one grid plate contacts said other grid plate.

16. A plurality of generally flat grid plates according to claim 15 wherein said connecting means comprises an adhesive.

17. A plurality of generally flat grid plates according to claim 15 wherein said connecting means comprises a projecting element and a receiving opening which receives said projecting element.

18. A plurality of generally flat plates according to claim 13 wherein said plurality of wave sections in said one grid plate are parallel to one another, said one grid plate having a longitudinal axis parallel to said parallel wave sections of said one grid plate, said plurality of wave sections in said other grid plate being parallel to one another, said other grid plate having a longitudinal axis parallel to said parallel wave sections of said other grid plate, said longitudinal axis of said one grid plate being perpendicular to said longitudinal axis of said other grid plate.

19. A plurality of generally flat grid plates according to claim 13 wherein said sections of said one grid plate are parallel to one another, said spaced wave sections of said one grid plate having crests disposed in a first plurality of parallel rows, said spaced wave sections of said one grid plate having valleys disposed in a second plurality of rows parallel to said first plurality of rows, said first and second plurality of rows being disposed at an acute angle relative to said parallel spaced wave sections of said one grid plate.

20. A plurality of generally flat grid plates according to claim 13 wherein one of said grid plates has spaced wave sections having an undulating configuration undulating about an extended axis when viewed in plan view, said axes of said undulating configured wave sections being parallel to one another, said one grid plate having wave sections with crests which are disposed in a first plurality of parallel rows, said one grid plate having wave sections with valleys disposed in a second plurality of rows parallel to said first plurality of rows, said first and second plurality of rows of said crests and valleys being disposed at an acute angle relative to said parallel axes of said undulating configured wave sections of said one grid plate.

21. A plurality of generally flat grid plates according to claim 20 wherein said extended sections of said one grid plate have an undulating configuration when viewed in plan view.

22. At least two flat grid plates to be upholstered, each of said grid plates being made of a resilient material, each of said grid plates including a plurality of solid portions which define a grid pattern and which form the boundaries of a plurality of grid openings, said solid portion including a plurality of spaced wave sections each having a plurality of extremea in the form of crests and valleys, and a plurality of spaced extended sections extending between and connected to said plurality of spaced wave sections at said extremea such that said spaced wave sections and said spaced extended sections define said grid opening, each of said at least two grid plates having substantially the same grid pattern, one of said two grid plates being disposed in superimposed relationship with the other of said grid plates such that the crests of the wave sections of one grid plate are disposed in superimposed relationship with the valleys of the wave sections of said other grid plate.

23. At least two flat grid plates according to claim 22 wherein each of said two grid plates have a top and a bottom, said one grid plate being in an inverted disposition relative to said other grid plate such that the top of said one grid plate engages the bottom of said other grid plate.

24. At least two flat grid plates according to claim 22 wherein said one grid plate has spaced wave sections parallel to one another, said one grid plate having a first longitudinal axis parallel to said parallel spaced wave sections of said one grid plate, said other grid plate having spaced wave sections parallel to one another, said other grid plate having a second longitudinal axis parallel to said parallel spaced wave sections of said other grid plate, said first and second longitudinal axes of said two superimposed grid plates being non-parallel.

25. At least two grid plates according to claim 24 wherein said first longitudinal axis is disposed at approximately ninety degrees relative to said second longitudinal axis.

26. A generally flat body according to claim 1 wherein said spaced wave sections are generally aligned with one another in a wave propagation direction and said extremea of said wave sections are generally aligned with one another in a transverse direction extending transversely of said wave propagation direction.

27. A generally flat body to be upholstered comprising at least one grid plate made of a resilient material, said grid plate including a plurality of solid portions which form the boundaries of a plurality of grid openings, said solid portions including a plurality of spaced wave sections each having a plurality of extremea in the form of crests and valleys which are devoid of straight portions which extend in the wave propogation direction over more than one wave length, a plurality of spaced extended sections extending between said plurality of spaced wave sections, and connecting portions connecting said extended sections to one of said wave sections and to a juxtaposed wave section disposed on one side of said one wave section and also connecting said extended sections to said one wave section and to a juxtaposed wave section disposed on the side of said one wave section which is opposite said one side such that said spaced wave sections and said spaced extended sections define said grid openings.

* * * * *